United States Patent [19]
Owens et al.

[11] Patent Number: 5,481,611
[45] Date of Patent: Jan. 2, 1996

[54] METHOD AND APPARATUS FOR ENTITY AUTHENTICATION

[75] Inventors: Leslie D. Owens, Westford; Robert R. Jueneman, Acton; Ralph Worrest, Hudson, all of Mass.; Alvah B. Davis, Atlanta, Ga.

[73] Assignee: GTE Laboratories Incorporated, Waltham, Mass.

[21] Appl. No.: 164,311

[22] Filed: Dec. 9, 1993

[51] Int. Cl.$^6$ .................................................... H04L 9/22
[52] U.S. Cl. ................................. 380/25; 380/23; 380/49
[58] Field of Search ................................. 380/23–25, 46, 380/49, 50

[56] References Cited

U.S. PATENT DOCUMENTS

| | | | |
|---|---|---|---|
| 4,178,476 | 12/1979 | Frost . | |
| 4,193,131 | 3/1980 | Lennon et al. | 380/50 |
| 4,612,413 | 9/1986 | Roberts et al. | 380/25 |
| 4,665,396 | 5/1987 | Dielman | 380/23 |
| 4,720,859 | 1/1988 | Aaro et al. | 380/25 |
| 4,720,860 | 1/1988 | Weiss | 380/25 |
| 4,833,701 | 5/1989 | Comroe et al. . | |
| 4,856,062 | 8/1989 | Weiss | 380/25 |
| 4,885,778 | 11/1989 | Weiss | 380/25 |
| 4,956,863 | 9/1990 | Goss | 380/23 |
| 4,998,279 | 3/1991 | Weiss | 380/25 |
| 5,023,908 | 6/1991 | Weiss | 380/24 |
| 5,058,161 | 10/1991 | Weiss | 380/23 |
| 5,097,505 | 3/1992 | Weiss | 380/23 |
| 5,168,520 | 12/1992 | Weiss | 380/25 |
| 5,237,612 | 8/1993 | Raith | 380/23 |
| 5,237,614 | 8/1993 | Weiss | 380/25 |
| 5,241,598 | 8/1993 | Raith | 380/23 |
| 5,249,230 | 9/1993 | Mihm, Jr. et al. | 380/23 |

OTHER PUBLICATIONS

Weiss, K. P., "To Serve and Protect: Reconciling Information Resource Protection with LAN Environments" Technical Support, Jan. 1992.
Security Dynamics ACE/Server product brochure, "Undefeatable Security for TCP/IP Network Environments" (1993).
Security Dynamics ACM/100 product brochure, "Access Control for Single–Line Dial–in Security" (1993).
Security Dynamics ACM/400 product brochure, "Access Control for Decentralized or Departmental Computing Environments" (1990).
Security Dynamics ACM/1600 product brochure, "Undefeatable Security for Centralized or Departmental Computing Environments" (1992).
Security Dynamics ACE System brochure, "Total Access Security" (1988).
Security Dynamics, Inc. ACE/Server Fact Sheet (1993).
Security Dynamics ACE/SERVER Question and Answer Sheets—Backgrounder (1993).
Mobile Phone News, "TRW's Phoneprint Added to Cellular's Anti–Fraud Arsenal", vol. 11, No. 41, Oct. 25, 1993.

*Primary Examiner*—Salvatore Cangialosi
*Attorney, Agent, or Firm*—Victor F. Lohmann, III; Lawrence E. Monks

[57] ABSTRACT

A cryptography-based entity authentication device (EAD) operated by a remote entity located at a subscriber site enables a telephone switch or computer system to identify and verify the authenticity of the entity. In one embodiment, the EAD encrypts a random digital sequence transmitted by a host facility and returns the encrypted signal to the host for comparison with another encryption signal generated locally by the host. If a match is detected, this serves as confirmation that the remote entity possesses the same encryption key as the host, therefore verifying the authenticity of the remote entity. Otherwise, the entity is deemed fraudulent and access is denied. In another embodiment, the host and subscriber site each include a respective time generation means which are maintained in relative time synchronicity. The EAD generates and encrypts a time signal for comparison with another encrypted time signal generated locally by the host. Transmissions between the host and subscriber site occur in a DTMF signal format to ensure compatibility with existing PSTN media.

19 Claims, 7 Drawing Sheets

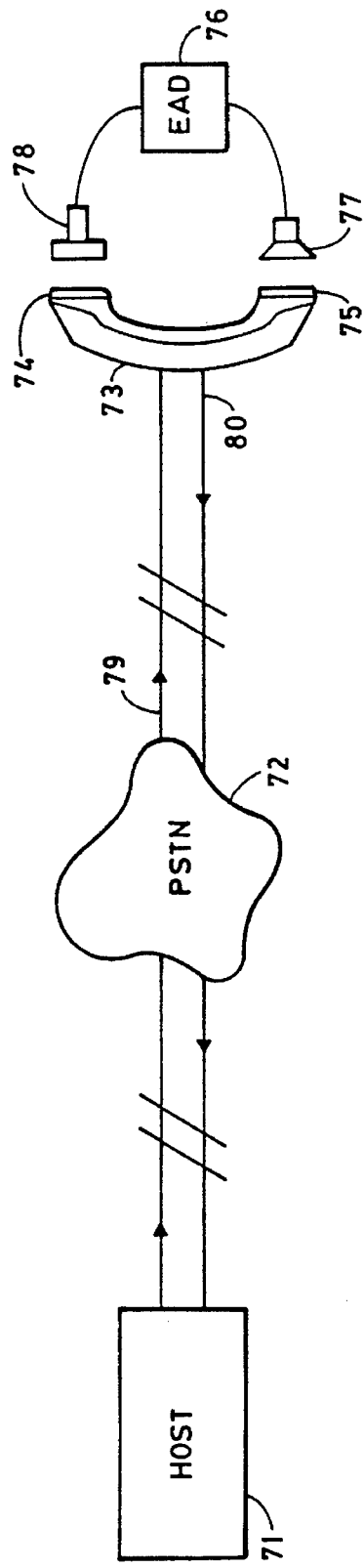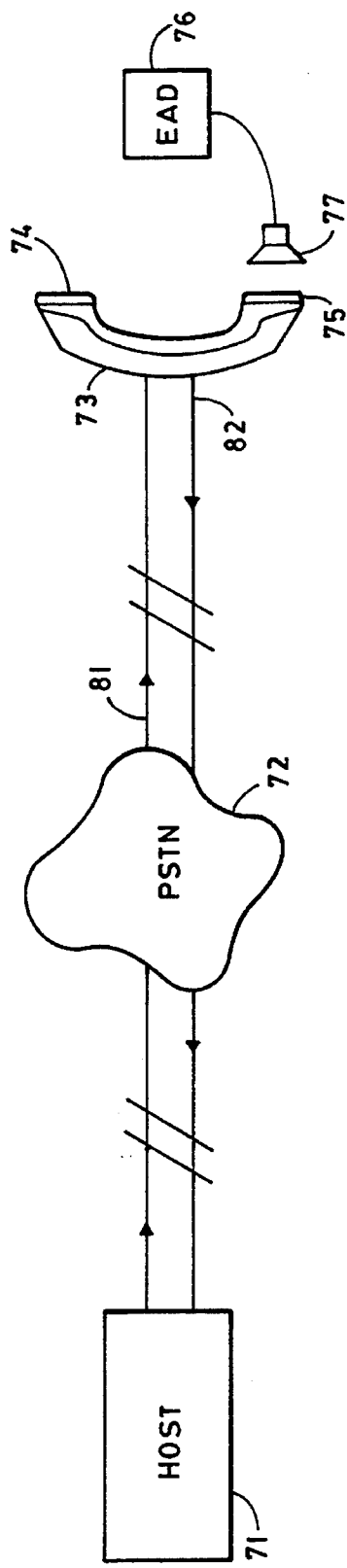

METHOD AND APPARATUS FOR ENTITY AUTHENTICATION

FIELD OF THE INVENTION

The present invention relates to user authentication and, more particularly, to a method and system for cryptographically authenticating a remote entity seeking access to a central facility.

BACKGROUND OF THE INVENTION

The security of wireless and wireline communications is increasingly being compromised by eavesdroppers who capture subscriber access codes and then use these codes to impersonate otherwise legitimate users to facilitate entry into the accounts or resources of these unsuspecting users. Although current systems are capable of identifying a user, these systems do not distinguish between an authentic user and a fraudulent entity seeking unauthorized access.

For example, a common approach to subscriber authentication includes the use of personal identification numbers (PIN) or passwords. A disadvantage of this approach, however, is that the PIN code or password is a static element of the system since it is changed only periodically, and sometimes not at all. Consequently, once a static password or PIN code is captured by an eavesdropper, the code may then be used to impersonate an otherwise authorized user.

Conventional analog mobile cellular systems are also susceptible to fraudulent, unauthorized access since only subscriber identification, and not authentication, is performed. In particular, a mobile cellular system typically employs a Mobile Identification Number (MIN) and Electronic Serial Number (ESN) to identify an entity. However, the system does not verify that the user is authentic. Thus, cellular telephone "cloning" is made possible by an eavesdropper who captures the ESN/MIN parameters and impersonates the otherwise legitimate entity.

OBJECTS OF THE INVENTION

It is an object of the present invention to obviate the above-noted and other disadvantages of the prior art.

It is a further object of the present invention to provide a method and system for entity authentication.

It is a further object of the present invention to dynamically execute entity authentication.

SUMMARY OF THE INVENTION

In one aspect of the present invention, a method of authenticating a user attempting access into a host facility from a remote subscriber site comprises the steps of generating a challenge code at the host; encrypting the challenge code to produce a host-encrypted code; transmitting a duplicate version of the challenge code to the subscriber site; encrypting the challenge code at the subscriber site to produce a user-encrypted code; transmitting the user-encrypted code to the host; and comparing the user-encrypted code to the host-encrypted code and, if a match is found, permitting the user to access the host.

The step of generating a challenge code at the host includes the step of generating a random digital sequence. The step of encrypting the challenge code to produce a host-encrypted code includes the step of cryptographically applying a key code to said digital sequence to produce a host-encrypted digital code. The step of transmitting the challenge code includes the steps of encoding a duplicate version of said digital sequence into a dual-tone-multi-frequency (DTMF) signal format suitable for transmission; and acoustically coupling the DTMF signal onto a transmission medium in operable communication with the subscriber site. The step of encrypting the challenge code at the subscriber site to produce a user-encrypted code includes the steps of decoding the DTMF signal from said host to recover said digital sequence; and encrypting the recovered digital sequence to produce a user-encrypted digital code. The step of transmitting the user-encrypted code includes the steps of encoding said encrypted digital code into a DTMF signal format suitable for transmission; and acoustically coupling the DTMF signal onto a transmission medium in operable communication with the host facility. The comparison step includes the steps of decoding the DTMF signal transmitted by the user site to recover the user-encrypted digital code; and comparing said user-encrypted digital code with said host-encrypted digital code.

In another aspect of the present invention, a system includes a subscriber site and host facility. The host facility comprises signal generation means for generating a random digital code encryption means coupled to the signal generation means for encrypting said digital code using a host encryption key; encoder means coupled to the signal generator means for encoding a duplicate version of said digital code into a dual-tone-multi-frequency (DTMF) signal format; and transmission means coupled to the encoder means for transmitting said DTMF signal to the subscriber. The subscriber site comprises a decoder means for detecting the DTMF signal transmitted from the host and recovering said digital code; encryption means coupled to the decoder means for encrypting said digital code using a user encryption key; encoder means coupled to the encryption means for encoding said user-encrypted digital code into a DTMF signal format; and transmission means coupled to the encoder means for transmitting said DTMF signal to the host. The host further comprises decoder means for detecting the DTMF signal transmitted from the subscriber and recovering said user-encrypted digital code; and comparator means coupled to said host encryption means and said host decoder means for comparing the host-encrypted digital code to said user-encrypted digital code.

In another aspect of the present invention, a method of authenticating a user attempting access to a host facility from a subscriber site comprises the steps of generating a respective time code at the host and at the subscriber; encrypting the respective time codes to produce a host-encrypted time code and a user-encrypted time code at the host and subscriber site, respectively; transmitting said user-encrypted time code to said host; and comparing the user-encrypted time code to the host-encrypted time code at the host to determine if a match condition is satisfied.

In another aspect of the present invention, a system includes a host and subscriber site. The subscriber site comprises means for generating a time code; means for encrypting the time code to produce a user-encrypted time code; and means for transmitting the user-encrypted time code to said host. The host comprises means for generating a time code; means for encrypting the time code to produce a host-encrypted time code; means for detecting the user-encrypted time code transmitted from said subscriber; and comparison means for comparing the host-encrypted time code to said user-encrypted time code to determine if a match condition exists.

BRIEF DESCRIPTION OF THE DRAWINGS

FIGS. 6A and 6B are diagrammatic illustrations of the first and second embodiments, respectively, of the present invention.

DETAILED DESCRIPTION OF PREFERRED EMBODIMENTS

As noted above, conventional mobile cellular systems are capable of identifying an entity which is attempting to access a host facility. However, these systems are not secure since a foreign entity may capture the static entry codes and use them to impersonate an otherwise legitimate subscriber.

The authentication procedures and systems described hereinbelow seek to determine whether the subscriber possesses an encryption key which matches the one held by the host facility. If a match condition occurs, authentication is realized and the user is permitted access to the host. However, if the match condition is not satisfied, the user is deemed fraudulent and denied access.

In accordance with one embodiment of the present invention, the host facility issues a challenge code to the user at the subscriber site and the user responds by encrypting the challenge code and forwarding this user-encrypted code to the host. The host, which also generates an encryption signal corresponding to an encrypted version of the challenge code, performs a comparison between the user-encrypted code and the host-encrypted code to determine if a match exists. The encryption operation at both the host and subscriber site employs a cryptographic algorithm using a key. A positive match confirms that the user possesses a key which matches that of the host, therefore authenticating the user. Otherwise, the user is deemed fraudulent.

Figure 1:
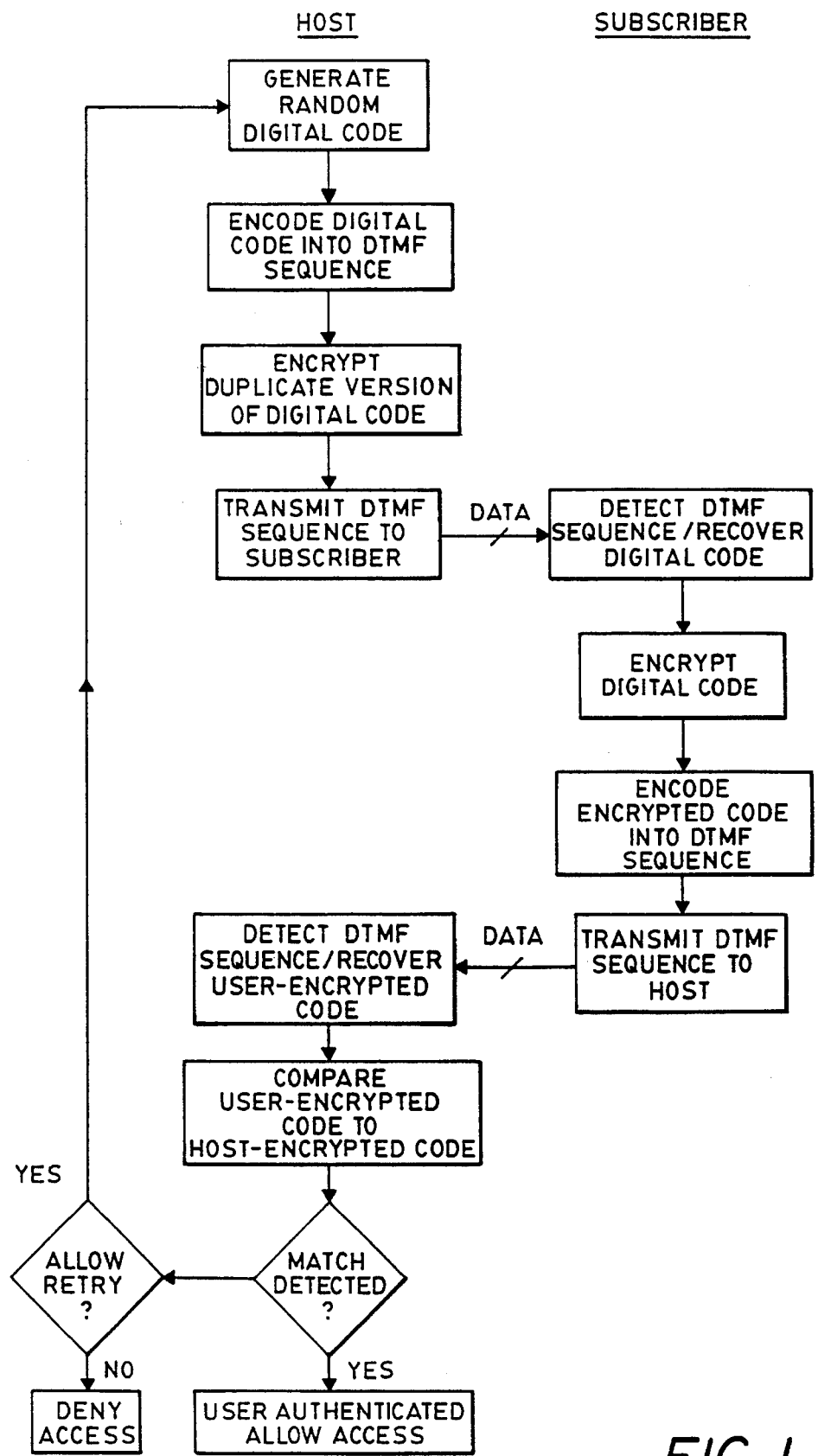
FIG. 1 is a flowchart outlining an authentication procedure in accordance with a first embodiment of the present invention.

FIG. 1 is a flowchart outlining the authentication procedure in accordance with the first embodiment of the present invention. Before the procedure is commenced, however, an initialization sequence is performed to establish physical connectivity between the host and subscriber site. For example, the user dials the telephone number of the host and, upon receiving the call, the host facility prompts the subscriber for an identification (ID) code. After the subscriber transmits an entity ID to the host facility, the host begins the authentication procedure.

In accordance with the authentication procedure, the host generates a random digital signal (e.g., the challenge code) which is encrypted to produce a host-encrypted code. The cryptographic algorithm employed by the host uses a stored secret key, and is preferably computationally infeasible to invert. The encryption may, for example, be accomplished with the Data Encryption Algorithm (DEA). The key used by the host is obtained from a database or other storage facility which has a compilation of user IDs and a respective key associated with each ID. Thus, when the host receives the user ID from the subscriber site, the associated key is retrieved from the database.

A duplicate version of the random digital code is encoded for transmission into a representative audio signal. In particular, the host uses a Dual-Tone-Multi-Frequency (DTMF) signalling format to encode the digital signal into a sequence of DTMF tones. A DTMF signalling format refers to a method of dial-pulse signalling based upon the generation of composite audio signals (tones) comprised of the superposition of two tones, namely a high frequency and a low frequency. DTMF signalling is useful in telecommunications applications including remote control and radio communications, and is particularly advantageous in voice-band transmission systems such as telephone, cellular, and specialized mobile radio.

Figure 7:
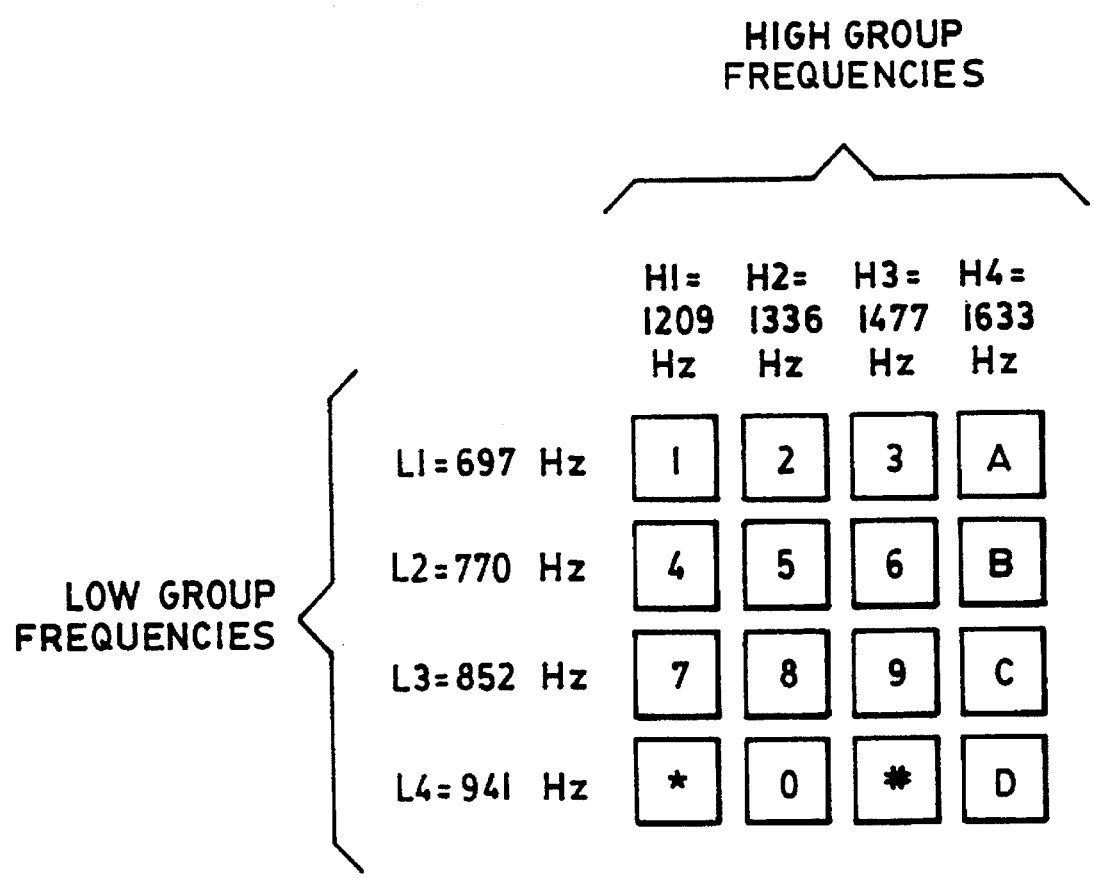
FIG. 7 shows a keypad encoder for illustrating DTMF encoding.

DTMF encoding may be further explained by reference to the keypad encoder of FIG. 7. A typical telephone handset generates DTMF tones with this exemplary encoder by engaging the user to select the appropriate tones by row-and-column addressing. For example, the four-byte message (in hexadecimal) 1A3456CF is encoded as tones L1H1, L1H4, L1H3, L2H1, L2H2, L2H3, L3H4, and L4H3. The "*" and "#" symbols represent the hex numerals E and F, respectively, while each other hex numeral corresponds to its respective keypad equivalent. In the present invention, there is no keypad encoding; rather, the frequency assignments are stored in a table which is accessed by a variable local oscillator to generate the appropriate frequency tones in accordance with the incoming digital sequence.

The DTMF tone sequence is transmitted to a receiving apparatus at the subscriber site where the tone sequence is detected and then decoded into its equivalent digital representation. The digital code recovered from the DTMF tone sequence corresponds to the random digital code initially generated by the host. In an encryption operation, the recovered digital code and an encryption key furnished by the user are applied to the same cryptographic algorithm as the one used by the host, thus producing a user-encrypted code. This user-encrypted digital sequence effectively serves as the user's response to the authenticity challenge issued by the host.

The user-encrypted digital code is then encoded at the subscriber site into a corresponding DTMF tone sequence that is transmitted to the host. An advantageous feature of the authentication procedure is that the user's response (e.g., user-encrypted digital sequence encoded into DTMF format) is automatically generated by the subscriber facility. In particular, the individual user is not required to execute any procedure to invoke a response to the host's authenticity challenge.

At the host facility, the DTMF sequence transmitted from the subscriber site is detected and, in a decoding operation, the user-encrypted digital code is recovered from the detected DTMF sequence. The host then performs a comparison of the user-encrypted code and the host-encrypted code. If a match condition occurs, the user has been verified as a party for whom access is authorized, and thus is deemed authenticated. In particular, since only an authentic user will possess the same key as the host, a match condition identifies the user as an authorized entity.

However, if a match condition does not occur, the host must assume that the non-match is due to an error in transmission or that an impersonator is seeking access as an unauthorized user. In the event of a no-match condition, the host re-initiates the authentication procedure. The number of retries, however, should not be unlimited; rather, it is preferable to restrict the user to three attempts which should be sufficient for authorized access unless the communications channel is excessively noisy. The transmission throughput is limited by not using any error detection or recovery mechanism, although an automatic repeat request (ARQ) or forward error correcting scheme may be employed.

Figure 2:
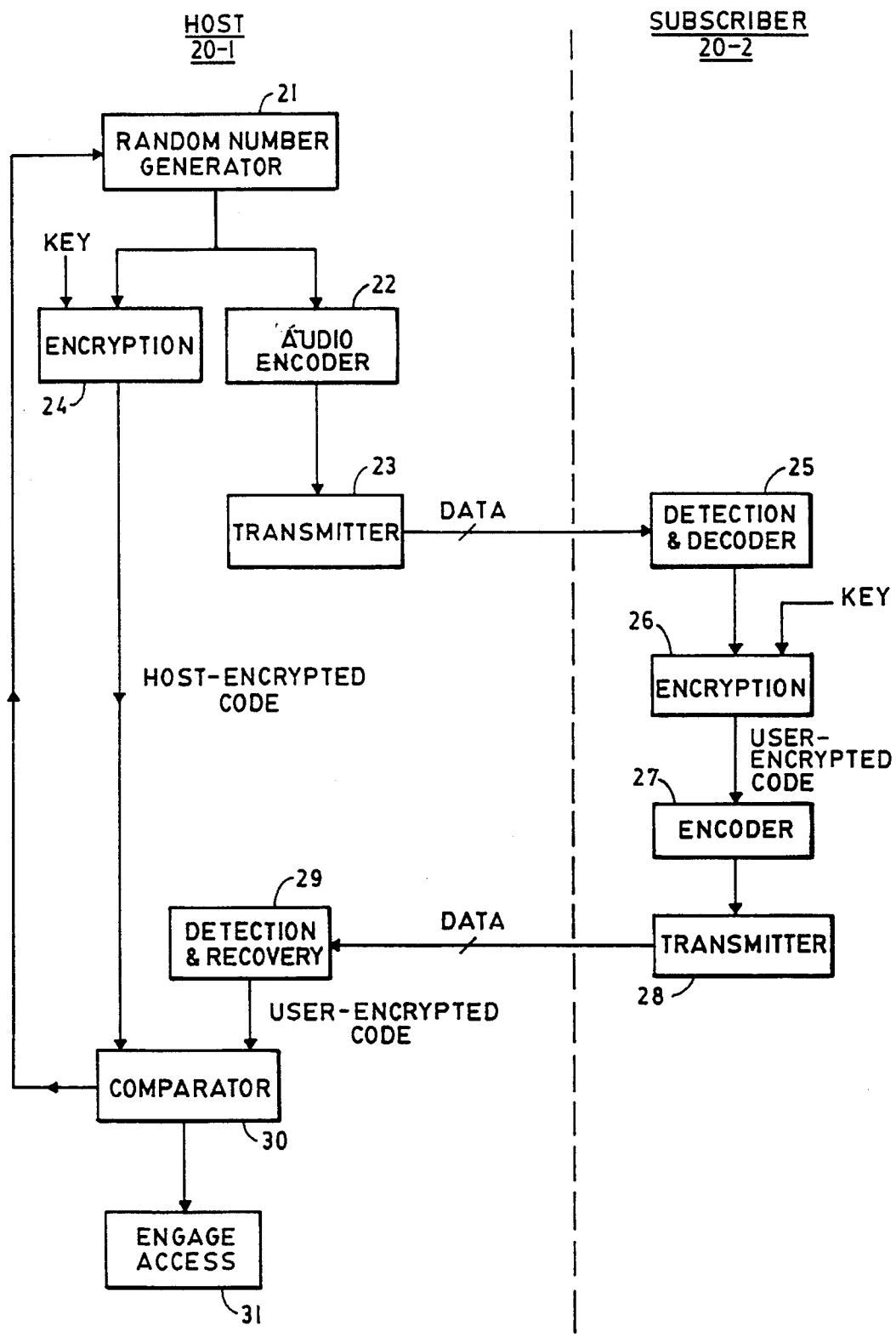
FIG. 2 is a system-level diagram of an implementation of the authentication procedure in FIG. 1.

FIG. 2 shows in block diagram format an exemplary system-level implementation of the authentication procedure in FIG. 1. Region 20-1 to the left of the dashed line represents the host facility, while region 20-2 to the right of the dashed line represents the subscriber site.

A random number generator 21 produces an 8-byte random digital sequence that is converted by audio encoder 22 into a representative audio signal consisting of 16 DTMF tones. In the DTMF sequence, a two-frequency tone represents a 4-bit value. The generated tone sequence occupies a 1.6 second time slot in which each tone is "ON" or active for 50 milliseconds, followed by a 50 millisecond "OFF" or inactive period before the next tone appears. A duplicate version of the random digital code is processed by a key-based encryption unit 24 to produce a host-encrypted digital code.

The DTMF tone sequence is forwarded by transmitter 23 to the subscriber site 20-2 over the public switched telephone network (PSTN). The transmitter 23 includes suitable means for acoustically coupling the output of audio encoder 22 onto the telephone network. At the subscriber site 20-2, modules 25–28 collectively function to prepare a response to the DTMF tone sequence received from the host. In particular, a detection and decoder unit 25 receives the audio signal (DTMF tones) and decodes the detected signal into its equivalent digital representation, namely the 8-byte random digital code initially generated by unit 21 at the host facility. An encryption unit 26 encrypts the recovered digital sequence using a key, thereby producing a user-encrypted digital code. This encrypted code is encoded by unit 27 into a representative 16-tone DTMF sequence and returned to the host over the PSTN via transmitter 28. The transmitter likewise includes suitable means for acoustically coupling the DTMF audio output from encoder 27 onto the PSTN.

The host employs a detection and recovery unit 29 to detect the DTMF sequence transmitted from the subscriber and recover the user-encrypted digital code. A comparator 30 performs a digital comparison of the host-encrypted code and user-encrypted code, and either re-initiates the authentication procedure if a match is not detected or engages the host to permit subscriber access if a match is detected.

The operating characteristics of the system shown in FIG. 2 are indicated for illustrative purposes only and therefore should not serve as a limitation of the present invention. For example, it should be obvious to those skilled in the art that other digital random codes may be generated and other key-based encryption algorithms may be used. Moreover, the communication paths between the host and subscriber site are not limited to a PSTN but may include any form of voice-band cellular radio telephone link or other suitable transmission media. In addition, the host facility may be implemented in any number of configurations. In a cellular system, for example, the host would correspond to a mobile telepone switching office and be configured as a computer system. Furthermore, the modules 25–28 (or their functional equivalents) are preferably integrated into a hand-held entity authentication device (EAD) employing a DTMF transceiver (receiver and transmitter) to perform the audio encoding/decoding functions. An exemplary implementation of one such EAD will be presented below in connection with FIG. 5.

In accordance with a second embodiment of the present invention, an entity authentication procedure is disclosed wherein the host and subscriber site each locally generate a representation of time that is encrypted and forwarded to a comparator to determine if a match condition is satisified. The time generators at the host and subscriber site must be suitably time-synchronized in order for the comparator to genuinely verify a positive match. Otherwise, without such synchronization, the comparator may falsely provide a no-match indication even though a match condition does indeed exist. The procedure is described below in greater detail in relation to the flowchart of FIG. 3.

As in the procedure of FIG. 1, a call initialization sequence is executed prior to invocation of the authentication procedure. In particular, the user places a call into the host facility; the host answers the call and prompts the user to provide identification (ID); and the user transmits the ID to the host.

The ID may be transmitted in a variety of ways. For example, the user may input the ID to a suitable transmission means which then forwards the ID to the host facility. Additionally, the EAD assembly may itself possess the ID and transmit the ID in a DTMF signal format preceding the DTMF-encoded, encrypted signal.

In accordance with the authentication procedure, a signal is generated at the subscriber site which corresponds to a representation of time. For example, the time signal may represent the current time-of-day as maintained by a time generator coupled to a local reference clock, or the time-of-epoch which indicates the amount of time that has elapsed in the current communication session between host and subscriber. This time signal is encoded into a corresponding digital representation that is encrypted by a one-way cryptographic algorithm to produce a user-encrypted time code. The algorithm is similar to the one used in the authentication procedure according to the first embodiment of the present invention. Specifically, the encryption is performed by cryptographically applying a stored key to the digital time code. The encrypted time signal is encoded into a representative DTMF signal format and transmitted to the host.

At the host facility, a signal corresponding to a representation of time is likewise generated, encoded into a digital sequence, and then encrypted by a key-based cryptographic algorithm to produce a host-encrypted time code. The host detects the DTMF signal transmitted from the subscriber site and recovers the user-encrypted time code in a decoding operation. The host then compares the user-encrypted time code with the host-encrypted time code to determine whether a match condition is satisfied.

If no match is detected, the host assumes that the failure is due to clock slippage, an error in transmission through the telephone system, or an impersonator attempting to gain unauthorized access. In the event that the respective time generators of the host and user have fallen out of synchronization, the host executes a windowing procedure whereby a window of additional responses are computed by the host for further comparison with the user's time-encrypted signal.

In an exemplary windowing procedure, the host computes 10 responses for times less than the time generated for the initial comparison and 10 responses for times greater than the initially-generated time. The responses are taken at sixty-second intervals, resulting in a total of 20 responses. If a match is found among one of these 20 responses, the host records the difference between the host and user clocks and updates its own time to that of the user.

The numerical quantities indicated above for the exemplary windowing procedure are for illustrative purposes only, and should not serve as a limitation of the present invention as it should be obvious to those skilled in the art that a variable number of responses may be computed with the appropriate hardware/software.

If no match is found during the windowing procedure, the host permits a limited number of retries in which a new set of time values from the host and user are generated, encrypted, and compared. A user should be able to secure access within three attempts unless the communications channel is exceedingly noisy or if the clocks are significantly out of synchronization.

Figure 3:
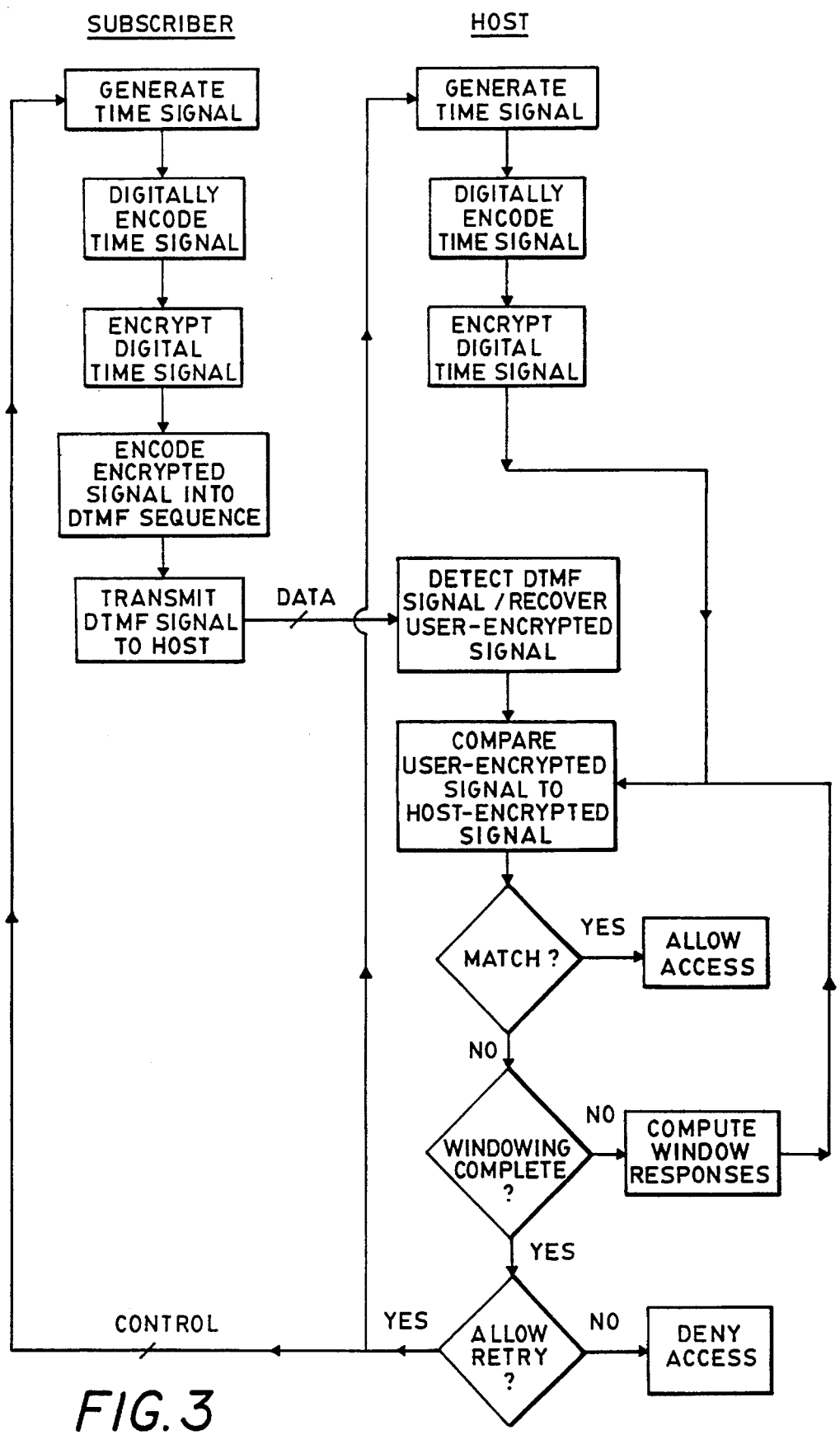
FIG. 3 is a flowchart outlining an authentication procedure in accordance with a second embodiment of the present invention.
Figure 4:
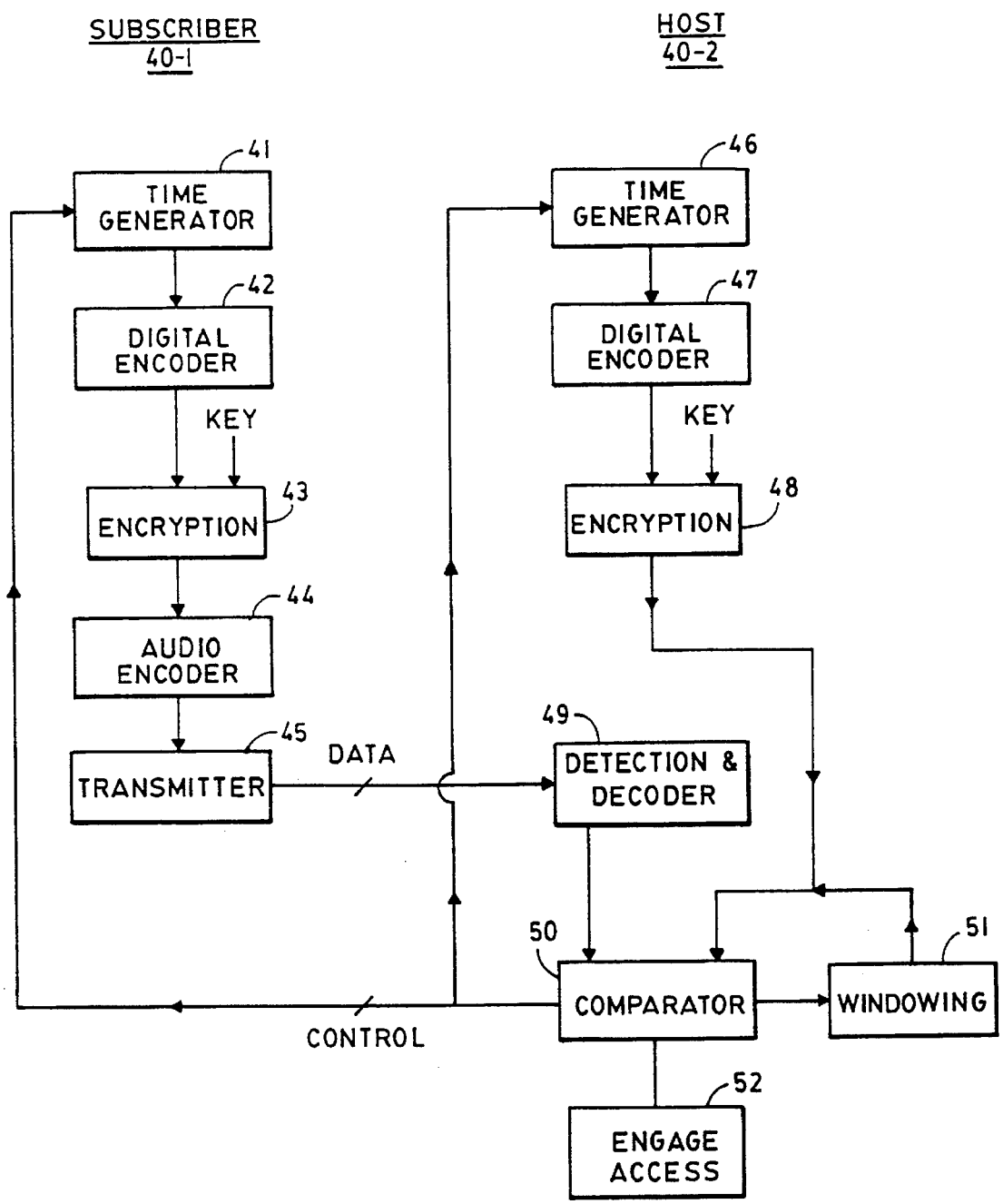
FIG. 4 is a system-level diagram of an implementation of the authentication procedure in FIG. 3.

FIG. 4 shows in block diagram format an exemplary system-level implementation of the authentication procedure outlined in FIG. 3. The subscriber site is designated with reference numeral 40-1, while the host facility is denoted by reference numeral 40-2.

A time generator 41 includes a real-time, continuously active clock assembly that produces a time code which may represent the current time of day or current time of epoch. A digital encoder 42 converts the time code into an 8-byte digital representation that is encrypted by encryption unit 43. The encryption unit employs a one-way cryptographic algorithm utilizing a secret key. Although not shown, the encryption unit 43 may receive the key from a storage means or from a user input means adapted to receive the key from a user interface.

An audio encoder 44 converts the encrypted digital time code into a representative DTMF tone sequence comprising sixteen tones. The DTMF tone sequence is acoustically coupled onto the telephone lines via transmitter 45 to facilitate communication with the host. The audio encoding and acoustic coupling functions performed by modules 44 and 45 are implemented by a DTMF transmitter unit. In contrast to the system of FIG. 2, the subscriber site in FIG. 4 does not receive a DTMF sequence from the host. Accordingly, a DTMF receiver and associated acoustic circuitry (e.g., microphone) are not required in the system of FIG. 4. Modules 41–45 (or their functional equivalents) are preferably integrated into a hand-held Entity Authentication Device (EAD) discussed below in connection with FIG. 5.

The host likewise includes a local time generator 46 which produces a representation of time that is encoded into a digital sequence by encoder unit 47. The digital time sequence is encrypted by unit 48 and coupled to a comparator 50. The time generator 46 utilizes a firmware, continuously operative real-time clock which records a time sequence approximately identical to that recorded and maintained by the entity authentication apparatus located at the subscriber site. The firmware clock is but one implementation as it should be obvious to those skilled in the art that other clock means are possible such as a hardware configuration.

The system of FIG. 4 includes a means (not shown) for initially synchronizing time generator 41 to time generator 46. Accordingly, the "time" recorded by the EAD is approximately the same as the "time" recorded by the host but is not necessarily the current time of day. For example, both the EAD and host may operate with an understanding that the "time" represents the start of the current epoch; thus, the EAD and host could then mutually advance their respective time generators to register a new time. Although not perfectly synchronized, the times recorded by the host and subscriber are presumed to be within some window of error due to clock drift dependent upon the precision of the crystal oscillators.

The DTMF audio signal from the subscriber is detected by the host and decoded by unit 49 into its equivalent digital representation corresponding to the user-encrypted digital time code. The comparator 50 performs a digital comparison of the user-encrypted time code with the host-encrypted time code to determine if a match condition is satisfied. If a match is detected, the host renders interface unit 52 operable to permit access by the user. Otherwise, the comparator 50 may invoke a windowing operation in unit 51 or re-initiate the entire authentication procedure by prompting time generators 41 and 46 to again produce time codes for encoding, encryption, and comparison.

Figure 5:
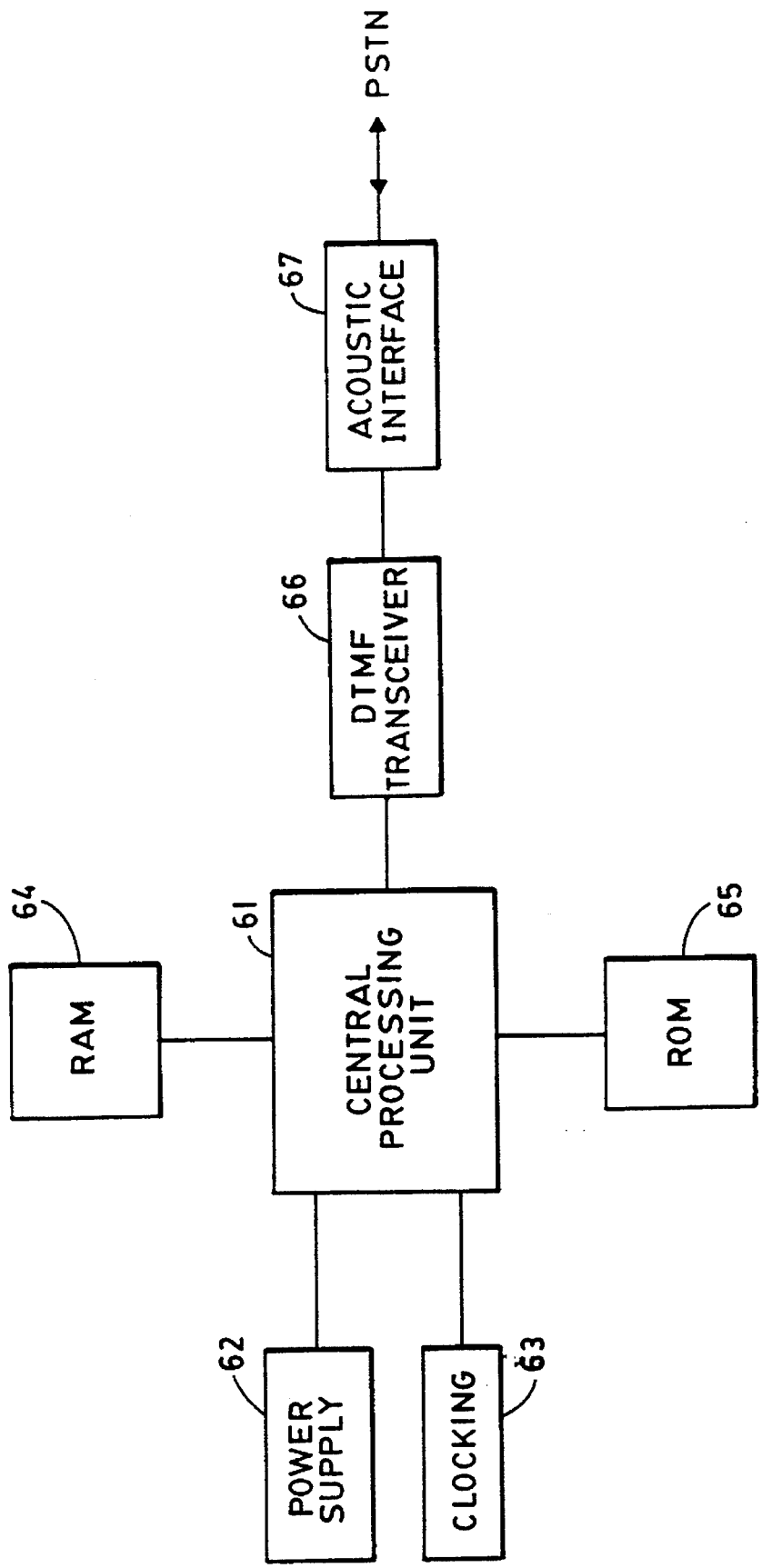
FIG. 5 represents a component configuration for the entity authentication systems of the present invention.

The entity authentication devices (EADs) shown in FIGS. 2 and 4 are each implementable as a single integrated unit. FIG. 5 illustrates an exemplary configuration of the EAD. The EAD includes a central processing unit (CPU) 61, a storage means comprising a random-access-memory (RAM) 64 and read-only-memory (ROM) 65, a DTMF transceiver 66, a power supply 62, and clocking circuitry 63. The DTMF transceiver is connected to an acoustic interface means 67 for acoustic coupling with the PSTN. The CPU, DTMF transceiver, and RAM/ROM units are interconnected via an internal address and data bus. These functional blocks may be implemented with the components identified below, although it should be obvious to those skilled in the art that other functionally equivalent components and circuits may be used without changing the basic operation of the EAD.

The CPU includes a 68HC11 8-bit microcontroller for providing signal processing, and a precision crystal oscillator furnishing clocking signals. The memory area includes a read-only-memory (ROM) unit implemented with a 27PC256 8×32k EPROM and an AT28C64 8×8k EEPROM for storage of the firmware program. The encryption algorithm, for example, may be stored in the ROM unit. The memory area further includes a 62C256 8×32k random access memory (RAM) for storage of cryptographic variables (e.g., encryption key) and temporary scratch data. The DTMF transceiver employs a pair of MT8880 DTMF chips for encoding and decoding DTMF waveforms. A 74HC138 3-to-8 line decoder furnishes the digital control signals to one of the MT8880 chips for generating the representative tone sequence. A MT8804A 8×4 analog switch couples the generated tone sequence to an LM386 audio amplifier for amplification prior to transmission via a speaker assembly acoustically coupled to the PSTN. The aforementioned component configuration should not serve as a limitation of the present invention as it should be obvious to those skilled in the art that the functions demonstrated by the components may be implemented with other functionally equivalent means.

The specific interconnections among the components listed above for assembling an integrated unit are readily ascertainable to those skilled in the art. Furthermore, the particular implementation is adaptable according to the embodiment being constructed, namely the entity authentication device of FIGS. 2 or 4. An enhanced level of security is provided by configuring the storage means at the host and EAD to adequately protect the secrecy of their respective cryptographic keys, and by employing a cryptographic algorithm that is highly resistant to deciphering.

FIGS. 6A and 6B demonstrate for comparison purposes the EAD configurations in accordance with the first and second embodiments, respectively, of the present invention. Similar components and/or assemblies among FIGS. 6A and 6B are identified with like numerical designations.

In accordance with the first embodiment shown illustratively in FIG. 6A, the communications environment includes a host 71 coupled to the subscriber site through a PSTN 72. At the subscriber site, there is a phone unit 73 including an earpiece 74 acoustically coupled to a microphone 78, and a mouthpiece 75 acoustically coupled to a speaker 77. The integrated EAD assembly includes signal processing unit 76 together with microphone 78 and speaker 77. As described hereinabove in relation to FIGS. 1–2, microphone 78 detects the DTMF-encoded random digital sequence arriving as signal 79; EAD unit 76 encrypts the recovered digital sequence and encodes it into a DTMF signal format; and the DTMF signal is coupled into the mouthpiece 75 via speaker 77 and, transmitted as signal 80. Although signals 79 and 80 are shown to be carried over distinct paths, this is for illustrative purposes only as it should be obvious that transmissions between the PSTN and subscriber occur over a single link.

In accordance with the second embodiment shown illustratively in FIG. 6B and discussed hereinabove in relation to FIGS. 3–4, the subscriber site does not receive a data signal from the host such as the random digital sequence in FIG. 6A. Rather, signal 81 is a control signal such as a voice command which requests the user (not shown) to activate operation of the EAD. Upon activation, the EAD generates the encrypted time code which is DTMF-encoded and then acoustically coupled by the speaker 77 into mouthpiece 75 for transmission as signal 82.

FIGS. 6A and 6B clearly convey certain operational differences between the respective EAD configurations. For example, in FIG. 6A, the encrypted response 80 prepared by EAD unit 76 is automatically generated upon receiving the challenge signal 79 from host site 71. Accordingly, there is no user involvement. However, in FIG. 6B, the EAD unit 76 is equipped with means for detecting an activation prompt (e.g., request for commencing EAD operation) received from the host site, and includes a trigger means such as a push-button which the user must engage to invoke the authentication procedure.

What has been shown and described hereinabove is a cryptography-based entity authentication device (EAD) that enables a telephone switch or computer system to identify and positively verify a remotely located entity (individual or machine) possessing such a device in wireless and wireline telephone communication systems. Accordingly, the present invention has application in a vast number of telephone-mediated transactions systems to provide authentication of entities and to prevent fraudulent or unauthorized access. For example, it may be used to authenticate an analog cellular telephone subscriber and thus reduce the possibility of fraud.

The EAD is capable of generating one-time (dynamic) passwords encoded in DTMF tones that are verified by the computer system. An eavesdropper that captures the dynamic passwords cannot at a later time impersonate the legitimate entity regardless of the number of times the legitimate entity's transmissions are captured. The probability that an impersonator could randomly guess the dynamic password can be made arbitrarily small.

The entity authentication procedures and EAD units described herein provide significant advantages over prior art systems. For example, while conventional systems employ static passwords as the only security measure, the present invention offers improved security because the passwords communicated from the subscriber site to host facility are dynamically generated. In particular, the subscriber generates a unique, one-time password every time access is attempted. In FIG. 2, the dynamic password corresponds to the random digital sequence generated by the random number generator 21 (and later encrypted, DTMF encoded, and returned to the host for comparison), while the dynamic password in FIG 4 corresponds to the time code produced by time generator.

Accordingly, even if a password is captured by an eavesdropper, subsequent attempts to access the host using this captured password will be unsuccessful since the password will have changed. In particular, the host issues a different random number to the subscriber (as the authenticity challenge) when access is attempted in FIG. 2, and employs a different time code for each access attempt in FIG.4.

Other novel features of the present invention include the use of DTMF tones for signal encoding of encrypted dynamic passwords, the automatic generation of responses by the EAD, and the acoustical coupling of the EAD assembly to a mobile or wireline telephone. Moreover, the specific utilization of the EAD for authentication of analog cellular subscribers would not require any modifications of the existing analog equipment. In particular, the EAD would be an assembly distinct from the subscriber's conventional transmission/reception equipment, and would simply be acoustically coupled to the given transmission medium using an appropriate interface means such as an audio amplifier and speaker assembly.

Although the embodiments discussed supra disclose a DTMF signalling format as the protocol for communication between host and subscriber, the present invention may include other signalling formats such as digital transmission or any tone-based format. Moreover, these embodiments disclose means for acoustically coupling the EAD onto the PSTN connecting the host and subscriber. However, the present invention may include other coupling means compatible with the particular transmissions media, such as inductive coupling, optical/infrared coupling, or direct electrical coupling.

While there has been shown and described herein what are presently considered the preferred embodiments of the invention, it will be obvious to those skilled in the art that various changes and modifications can be made therein without departing from the scope of the invention as defined by the appended claims.

We claim:

1. A method of authenticating a user attempting access into a host facility from a remote subscriber site, comprising the steps of:

generating a challenge code including a random digital sequence at the host;

encrypting the challenge code by cryptographically applying a key code to said digital sequence to produce a host-encrypted code;

transmitting a modified version of the challenge code by encoding said challenge code into a dual-tone-multi-frequency (DTMF) signal format suitable for transmission to a first electronic device at the subscriber site; and acoustically coupling the DTMF signal received at the first electronic device at the subscriber site onto a transmission medium in operable communication with a second electronic device at the subscriber site;

encrypting the challenge code at the second electronic device at the subscriber site to produce a user-encrypted code;

transmitting by the second electronic device the user-encrypted code to the first electronic device and transmitting by the first electronic device the user-encrypted code to the host; and comparing at the host the user-encrypted code to the host-encrypted code and, if a match is found, permitting the user to access the host.

2. The method as recited in claim 1 wherein the step of encrypting the challenge code by the second electronic device at the subscriber site to produce a user-encrypted code includes the steps of:

decoding the DTMF signal from said host to recover said digital sequence; and encrypting the recovered digital sequence to produce a user-encrypted digital code.

3. The method as recited in claim 2 wherein the step of encrypting said digital sequence includes the step of:

cryptographically applying a key code to said recovered digital sequence.

4. The method as recited in claim 3 wherein the step of transmitting by the second electronic device the user-encrypted code includes the steps of:

acoustically coupling the DTMF signal onto a transmission medium in operable communication with the host facility.

5. The method as recited in claim 4 wherein the comparison step includes the steps of:

decoding the DTMF signal transmitted by the first electronic device to recover the user-encrypted digital code; and comparing said user-encrypted digital code with said host-encrypted digital code.

6. A method of authenticating a user attempting access to a host facility from a subscriber site having two devices located thereat, comprising the steps of:

at the host,
generating a digital sequence;
encrypting the digital sequence;
encoding a duplicate version of the digital sequence into a dual-tone-multi-frequency (DTMF) signal format;
transmitting the DTMF signal to the user site;

at the subscriber site,
decoding by a first device the DTMF signal transmitted from the host into said digital sequence;
encrypting by a first device said digital sequence;
encoding by a first advice the encrypted digital sequence into a DTMF signal format;
sending safe DTMF signal format to a second device;
transmitting by the second device the DTMF signal to said host;

at the host,
detecting the DTMF signal transmitted from the second device and recovering the user-encrypted digital sequence; and
comparing the host-encrypted digital sequence with the user-encrypted digital sequence to determine if a match condition exists.

7. A system including a subscriber site having a first and second device located there at and a host facility, comprising:

at the host,
signal generation means for generating a random digital code;
encryption means coupled to the signal generation means for encrypting said digital code using a host encryption key;
encoder means coupled to the signal generator means for encoding a duplicate version of said digital code into a dual-tone-multi-frequency (DTMF) signal format;
transmission means coupled to the encoder means for transmitting said DTMF signal to the subscriber;

at the subscriber site,
decoder means of a first device for detecting the DTMF signal transmitted from the host and recovering said digital code;
encryption means at said first device coupled to the decoder means for encrypting said digital code using a user encryption key;
encoder means at said first device coupled to the encryption means for encoding said user-encrypted digital code into a DTMF signal format;
sending means at said first device for sending said DTMF signal format to a second device at the subscriber site;

transmission means of said second device, coupled to the encoder means transmitting said DTMF signal to the host;

at the host,
decoder means for detecting the DTMF signal transmitted from the second device and recovering said user-encrypted digital code;
comparator means coupled to said host encryption means and said host decoder means for comparing the host-encrypted digital code to said user-encrypted digital code.

8. The system as recited in claim 7 further comprises request means at the host for prompting said subscriber site for identification;

means at the subscriber site responsive to the host prompt for issuing an entity identification (ID) to said host;

storage means at the host including a plurality of entity identifications each correlated with a respective encryption key; and retrieval means at the host adapted to receive the entity ID issued from the subscriber site and coupled to said storage means for retrieving the encryption key corresponding to said entity ID and supplying said encryption key to said host encryption means.

9. In a communications environment including a host facility and subscriber, said host facility including means for generating a digital code, means for encoding the digital code into a DTMF signal format, and means for transmitting the DTMF signal to said subscriber site, said subscriber site consisting of a first and second device, including an entity authentication apparatus comprising:

detection means at said second device for acoustically detecting the DTMF signal transmitted from said host;

decoder means coupled to said detection means for recovering the digital code;

encryption means coupled to said decoder means for encrypting said recovered digital code;

encoder means coupled to said encryption means for encoding the subscriber-encrypted digital code into a DTMF signal format; and transmission means coupled to said encoder means for acoustically transmitting the DTMF signal to said first device transmission means at said first device for transmitting the DTMF signal to said host.

10. The second device of the communication environment as recited in claim 9 further comprises:

storage means for storing an encryption key; and
retrieval means coupled to the storage means and operable in response to a key request from said encryption means for sending the encryption key to said encryption means.

11. The communication environment as recited in claim 9 wherein said host facility further comprises:

host encryption means coupled to said generation means for encrypting a replicate version of said digital code;

host detection means for detecting the DTMF signal transmitted from said subscriber site;

host decoder means coupled to said host detection means for recovering the subscriber-encrypted digital code; and comparison means coupled to the host encryption means and host decoder means for comparing the subscriber-encrypted digital code to the host-encrypted digital code.

12. A method of authenticating a user attempting access to host facility from a subscriber site, comprising the steps of:

generating a respective time code representative of time at the host and at the subscriber site;

encoding the host time signal into a host digital time sequence;

encoding the subscriber time signal into a subscriber digital time sequence;

encrypting the respective time codes to produce a host-encrypted time code and a user-encrypted time code at the host and subscriber site, respectively by cryptographically applying a user key to the subscriber digital time sequence and cryptographically applying a host key to the host digital time sequence;

transmitting said user-encrypted time code in a dual-tone-multi-frequency (DTMF) signal format by acoustically coupling the DTMF signal onto a transmission media to said host;

comparing the user-encrypted time code to the host-encrypted time code at the host to determine if a match condition is satisified.

13. The method as recited in claim 12 wherein the comparison step includes the steps of:

decoding the DTMF signal transmitted from the subscriber and recovering said user-encrypted digital time sequence; and digitally comparing said user-encrypted digital sequence time with said host-encrypted digital time sequence.

14. A system including a host and subscriber site, comprising:

at the subscriber site,
means for generating a time code;
means for encrypting the time code to produce a user-encrypted time code;
means for transmitting the user-encrypted time code to said host;

at the host,
means for generating a time code;
means for encrypting the time code to produce a host-encrypted time code;
means for detecting the user-encrypted time code transmitted from said subscriber; and
comparison means for comparing the host-encrypted time code to said user-encrypted time code to determine if a match condition exists.

15. The system as recited in claim 14 wherein:

the generation means at the subscriber site comprises
means for producing a signal representative of time, and
means coupled to said signal production means for encoding the signal into a digital time code;

the transmission means at the subscriber site comprises
audio means for encoding the digital time code into a dual-tone-multi-frequency (DTMF) signal format, and
means for acoustically coupling the DTMF signal onto a transmission medium in operable communication with said host;

the generation means at the host comprises
means for producing a signal representative of time, and
means coupled to said signal production means for encoding the signal into a digital time code.

16. In a communications system including a host facility and subscriber site, said subscriber site including an entity authentication apparatus comprising:

signal generation means for generating a signal representative of time;

digital encoder means for encoding the time signal into a digital signal;

encryption means for encrypting the digital signal to produce a user-encrypted time code;

audio encoder means for converting the user-encrypted time code into a dual-tone-multi-frequency (DTMF) signal format; and transmission means for transmitting the DTMF signal to the host site.

17. The entity authentication apparatus as recited in claim 16 wherein the host facility comprises:

signal generation means for generating a signal representative of time;

digital encoder means for encoding the time signal into a digital signal;

decoder means for encrypting the digital signal to produce a host-encrypted time code;

detection means for detecting the DTMF signal transmitted from the subscriber site and recovering the user-encrypted time code; and comparison means for comparing the host-encrypted time code to the user-encrypted time code.

18. The entity authentication apparatus as recited in claim 17 wherein:

the encryption means of said entity authentication apparatus comprises
means for storing an encryption key; and
cryptography means coupled to said storage means and said digital encoder-means for retrieving the encryption key and cryptographically applying the key to said digital signal.

19. The entity authentication apparatus as recited in claim 18 wherein:

the host facility further comprises
means for prompting the subscriber site for entity identification (ID);
storage means for storing a plurality of entity identifications each associated with a respective host encryption key;

the entity authentication apparatus further comprises
means responsive to the prompt from said host for issuing an entity ID to said host;

the encryption means at said host comprises
retrieval means coupled to the storage means of said host and adapted to receive the entity ID issued by said entity authentication apparatus for retrieving the host encryption key associated with said entity ID;

cryptography means coupled to said retrieval means and said host digital encoder means for cryptographically applying the retrieved host encryption key to said digital signal.

* * * * *